Patented Feb. 15, 1949

2,461,551

UNITED STATES PATENT OFFICE 2,461,551

COMPOSITION COMPRISING A RUBBERY COPOLYMER OF BUTADIENE AND STYRENE AND A RESIN OCCURRING IN UTAH RESIN-BEARING COAL

Ernest D. Lee, Teaneck, and Loy S. Engle, Harrington Park, N. J., assignors to Interchemical Corporation, New York, N. Y., a corporation of Ohio No Drawing. Application January 11, 1946, Serial No. 640,676

6 Claims. (Cl. 260—27)

This invention relates to the processing of butadiene-styrene rubbery copolymers and is particularly directed to the improvement of the processing characteristics thereof whereby such copolymers can be more readily handled by the customary rubber-processing equipment. More especially, the present invention is concerned with the improvement of the tackiness of a butadiene-styrene rubbery copolymer containing from about 20% to about 30% styrene.

Although butadiene-styrene rubbery copolymers such as GR—S, Buna S, and the like have gone into extensive use during the past few years, the processing of this type of synthetic rubber presents various difficulties which render the working thereof prolonged and expensive. In particular, butadiene-styrene rubbery copolymers of this type exhibit a decided lack of tack or cohesive bonding, which weakness leads to difficulty in the handling of such copolymers on conventional rubber-working machinery, especially the customary roll mill. This difficulty in handling evidences itself principally in poor following of the rolls of a roll mill and in poor acceptance or wetting of reinforcing fillers and pigments by such rubbery copolymers.

We have now found that the processing characteristics of butadiene-styrene rubbery copolymers can be materially improved by incorporating therewith a small amount of a Utah-type coal resin. The presence of the coal resin has been found to reduce the time and the cost of milling a butadiene-styrene copolymer and of incorporating compounding ingredients therewith. In particular, the addition of the coal resin serves to increase the tack of butadiene-styrene copolymers containing from about 20% to about 30% styrene to such an extent that the processability thereof is brought substantially to a par with that of natural rubber. Such a butadiene-styrene rubbery copolymer containing a Utah-type coal resin not only follows rolls properly but also readily accepts the necessary amounts of pigments, fillers, and the like customarily added to rubbery materials during the processing thereof. Moreover, the presence of the Utah-type coal resin does not adversely affect the curing of the milled butadiene-styrene rubbery compound, and the cured compounded copolymer exhibits good tensile strength, ultimate elongation, and hardness. The addition of the coal resin also effects a decided reduction in the nerve of the copolymer.

The coal resin which we incorporate with butadiene-styrene copolymers is obtained from resin-bearing coals such as those found in extensive deposits in Utah. These coals, particularly those obtained from the Utah deposits, contain substantial percentages (up to 5% and more) of such resinous material, which may be separated and recovered therefrom in various manners. In accordance with the present invention, the resin is preferably employed in a coal-free condition. It can advantageously be recovered from the coal by the following two-stage procedure:

The resin is first separated from the bulk of the coal by aqueous flotation as described, for example, in Green, 1,773,997. The resulting resin concentrate, which still contains an appreciable proportion of coal (up to 15 to 20%) admixed therewith, is then dissolved in a solvent composed essentially of saturated hydrocarbons having 6 or less carbon atoms in accordance with the disclosure of the copending Lee application, Serial No. 515,804, filed December 27, 1943, now abandoned. The insoluble coal is separated from the resulting resin solution by filtration, and the resin itself is then recovered in a substantially coal-free condition by vaporization of the solvent from the solution. If a light-colored resin product is desired, the resin solution may be filtered through a bed of activated clay or the like.

A typical Utah-type coal resin, recovered in this manner, is soluble in ethers, petroleum and coal-tar hydrocarbons, and vegetable oils, partially soluble in esters and ketones, and insoluble in the lower alcohols. The following physical and chemical characteristics are typical of a representative Utah-type coal resin which has been recovered by extraction with hexane:

| | |
|---|---|
| Specific gravity | 1.03–1.06 |
| Softening point (mercury method) | 160° C. |
| Melting point (mercury method) | 165°–180° C. |
| Refractive index | 1.544 |
| Physical state | Brittle solid |
| Acid value | 6–8 |
| Iodine number | 100–140 |
| Molecular weight (average) | 1000 |
| Analysis: | |
|     Carbon | 86.95% |
|     Hydrogen | 11.10% |
|     Oxygen | 1.95% |

The coal resin is advantageously compounded with a butadiene-styrene rubbery copolymer, especially a copolymer containing from about 20% to about 30% styrene, in an amount ranging from about 5 to about 25% based on the weight of the copolymer. Within this range of proportions occurs the most significant increase in processibility of the rubbery copolymer with the production of a cured product having the most desirable characteristics. Less than 5% of the coal resin may be used, but in such case the increase in processibility of the copolymer may not be sufficient to permit the ready incorporation therewith of the desired amounts of pigments and fillers. More than 25% of the coal resin may also be employed, but in such event the cured compounded copolymer may be too boardy for certain applications. Sufficient coal resin should, of course, be incorporated with the butadiene-styrene copolymer to improve its processing characteristics and to enable it to be broken down on milling to the extent necessary for the desired purpose. The resin may be incorporated with the copolymer either before the copolymer is passed through a roll mill or other rubber handling equipment or during the milling of the copolymer.

The following examples illustrate typical formulations of GR—S rubber (a copolymer of about 75% butadiene and 25% styrene) compounded with a coal-free Utah-type coal resin:

Example 1

A GR-S-containing tire-tread stock was prepared from the following materials:

| | Parts by weight |
|---|---|
| GR-S | 250 |
| Carbon black | 135 |
| Utah-type coal resin (coal-free) | 45 |
| Zinc oxide | 15 |
| Sulfur | 6 |
| Condensation product of mercaptobenzothiazole with cyclohexylamine | 5.25 |

The presence of the coal resin rendered the milling of the GR-S copolymer and the incorporation of the other ingredients therewith much more easy. The milled copolymer compound possessed an increased dry tack and exhibited an excellent tack when it was washed with gasoline.

Example 2

The following formulation illustrates a GR-S copolymer compound having a very high degree of tackiness.

| | Parts by weight |
|---|---|
| GR-S | 200 |
| Carbon black | 150 |
| Utah-type coal resin (coal-free) | 50 |
| Zinc oxide | 10 |
| Sulfur | 3 |
| Mercaptobenzothiazole | 2 |
| Stearic acid | 2 |
| Zinc dibutyl dithiocarbamate | 1 |

The compounded GR-S was readily millable.

The coal resin imparted an extremely high degree of tack to the copolymer compound as evidenced by the fact that two pieces of the milled compound were self-sealing when placed together. Samples of the milled compound were cured for one hour at 350° F. and were found to have the following properties:

| | |
|---|---|
| Tensile strength lbs. per sq. inch | 1860 |
| Elongation (ultimate) per cent | 2800 |
| Shore hardness per cent | 60 |

We claim:

1. A composition comprising a rubbery copolymer of butadiene and styrene and 5–25% on the weight of the copolymer of a resin consisting essentially of carbon and hydrogen, having an average molecular weight on the order of 1000 and a refractive index of 1.544 and occurring in Utah resin-bearing coals.

2. The composition as claimed in claim 1, in which the rubbery copolymer of butadiene and styrene contains from about 20% to about 30% styrene.

3. The composition as claimed in claim 1, in which the rubbery copolymer of butadiene and styrene contains approximately 75% butadiene and 25% styrene.

4. In the method of compounding a butadiene-styrene rubbery copolymer, the steps of incorporating with such a copolymer 5 to 25%, based on the weight of the copolymer, of a resin consisting essentially of carbon and hydrogen, having an average molecular weight on the order of 1000 and a refractive index of 1.544 and occurring in Utah resin-bearing coals, and milling the mixture to obtain a rubber compound.

5. The method of compounding a butadiene-styrene rubbery copolymer as claimed in claim 4 in which the rubbery copolymer contains from about 20% to about 30% styrene.

6. The method of compounding a butadiene-styrene rubbery copolymer as claimed in claim 4 in which the rubbery copolymer contains approximately 75% butadiene and 25% styrene.

ERNEST D. LEE.
LOY S. ENGLE.

REFERENCES CITED

The following references are of record in the file of this patent:

UNITED STATES PATENTS

| Number | Name | Date |
|---|---|---|
| 2,310,492 | Nagelvoort | Feb. 9, 1943 |
| 2,364,090 | Nagelvoort | Dec. 5, 1944 |
| 2,379,389 | Tillotson | June 26, 1945 |
| 2,382,731 | Little | Aug. 14, 1945 |